Jan. 27, 1953         H. H. C. RICHARDS, JR         2,627,007
                         PILE REGULATOR
Filed June 20, 1950                              2 SHEETS—SHEET 1

WITNESSES:
Edward Michaels
Nw. L. Groome

INVENTOR
Harrison H. C. Richards, Jr.
BY
James K. Ely
ATTORNEY

Jan. 27, 1953  H. H. C. RICHARDS, JR  2,627,007
PILE REGULATOR

Filed June 20, 1950  2 SHEETS—SHEET 2

WITNESSES:
Edward Michaels
Nw. L. Groome

INVENTOR
Harrison H. C. Richards, Jr.
BY James R. Ely
ATTORNEY

UNITED STATES PATENT OFFICE 2,627,007

PILE REGULATOR

Harrison H. C. Richards, Jr., Lima, Ohio, assignor to Westinghouse Electric Corporation, East Pittsburgh, Pa., a corporation of Pennsylvania Application June 20, 1950, Serial No. 169,117

6 Claims. (Cl. 201—51)

This invention relates to pile regulators and, in particular, to pile regulators of the lightweight aviation type.

In carbon pile regulators of the type shown in Patent 2,268,718, issued January 6, 1942, to F. Newton, a special armature assembly is utilized for effecting a control of the pressure applied to the stack of discs of resistance material. The assembly of the components thereof is time consuming and expensive since considerable care must be exercised to produce a spring characteristic which will have the proper relation to the magnetic pull produced by the electromagnet.

Thus the multiple spring of the Newton regulator must be assembled by hand, often requiring the reforming of each leaf of the spring by hand. The thickness of the spring members and spacer members used therewith is quite critical, it being found that any small burrs around the holes therein or edges thereof will affect the resulting characteristics.

Recently, an improvement in the spring assembly of this type of regulator has been made as shown and claimed in Patent 2,488,455, issued November 15, 1949 to Walley, and assigned to the assignee of this invention. In the Walley structure, a single spring member is held between two members having complementary coined convex and concave surfaces to impart a predetermined shape to the spring for producing a given characteristic in the regulator. While this improvement is a distinct advantage over the Newton type of spring assembly, it has the disadvantage that the spring characteristics of the assembled components cannot be adjusted so as to produce changes in the operating characteristics of the regulator.

An object of this invention is the provision in a pile regulator of a simplified armature and spring assembly for working against an abutment member to control the pressure applied to the pile.

Another object of this invention is to provide in a pile regulator having an armature and spring assembly therefor, for adjusting the loading of the spring member.

A further object of this invention is to provide in a pile regulator having an electromagnet and an armature and spring member for working against an abutment member, for adjusting the loading of the spring member, and/or for adjusting the position of the abutment member relative to the face of the electromagnet to change the operating characteristics of the pile regulator.

Other objects of this invention will become apparent from the following description when taken in conjunction with the accompanying drawings, in which.

Figure 1:
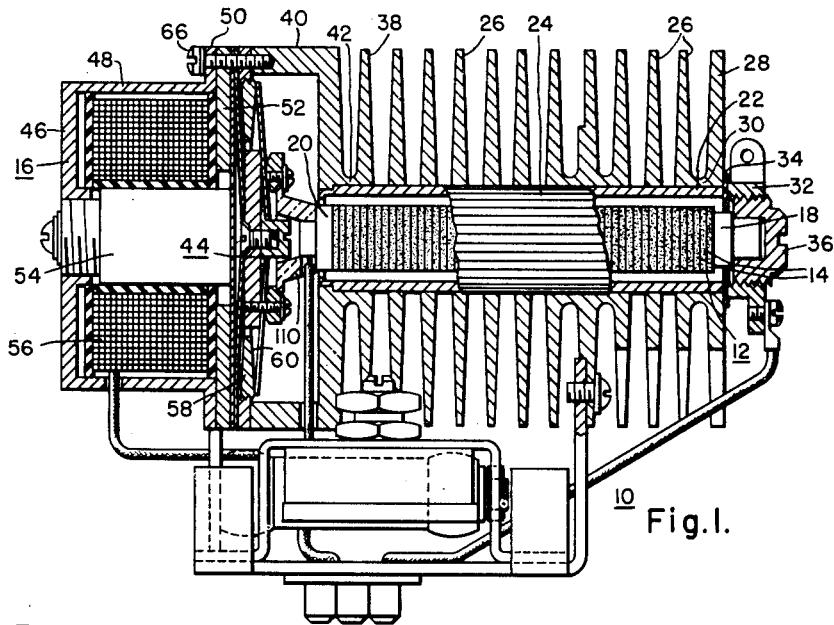
Figure 1 is a view in side elevation and partly in section of a regulator embodying the teachings of this invention.

Referring to Fig. 1 of the drawings, this invention is illustrated by reference to a pile regulator 10 formed of a stack 12 of discs 14 of resistance material such as carbon and an electromagnet assembly 16 disposed to control the pressure on the stack 12.

In the embodiment illustrated in Fig. 1, the stack 12 is disposed between a relatively fixed pressure member or plate 18 and a movable pressure plate 20, being encased in a metallic tubular housing 22. The housing 22 is provided with an outer surface 24 which is roughened as by knurling, fluting, or otherwise forming ribs or grooves thereon to aid in securing a plurality of cooling fins 26 thereon. The cooling fins 26 are preferably of aluminum and are disposed about the housing 22 in spaced relation lengthwise of the housing 22 for dissipating heat which is developed in the stack during an operation of the regulator.

As a general rule, the cooling fins 26 are independently mounted, one from the other, depending upon their interlocking relation with the roughened surface 24 of the housing 22 for maintaining them in operative position on the housing. However, as illustrated, the terminal fin 28 at the end of the stack adjacent the fixed pressure plate 18 is formed as an integral unit with the adjacent fin 26, a common hub 30 being formed therebetween for strengthening the support of the fins on the housing. This is done in order to facilitate mounting an end plate 32 to the terminal fin 28 by any suitable means (not shown), a washer 34 of insulation being disposed between the terminal plate 32 and the terminal fin 38. An adjustable nut 36 is disposed in threaded engagement with the plate 32 for receiving the pressure plate 18 and for making an initial adjustment of the pressure on the stack 12.

At the opposite end of the stack, the terminal fin 38 is formed simultaneously with a section 40 of a sectionalized housing for the electromagnet 16. Thus the section 40 and the terminal fin 38 are formed with a common hub 42 therebetween, the hub being securely interlocked with the roughened surface 24 of the housing 22 to provide a strong support for the section 40 of the sectionalized housing. The section 40 of the sectionalized housing is preferably of a cup-shaped form to substantially enclose the armature assembly 44 of the electromagnet 16.

As illustrated, the electromagnet 16 is of usual construction having an iron core magnetic housing formed of a base plate 46, side wall member 48 having outwardly turned flanges 50 thereon and end pole pieces 52 with an adjustable core member 54 disposed centrally thereof. The energizing winding 56 of the electromagnet is disposed within the magnetic housing about the core member 54 being insulated from the magnetic housing and the core member in any suitable manner.

The armature assembly 44 is disposed to cooperate with an abutment member 58 provided with a sloped surface 60 which constitutes mutually inclined surfaces thereon for controlling the pressure applied to the stack 12. As illustrated and more clearly shown in Fig. 3, the abutment member 58 comprises an annular member, the outer edge of which is provided with threads 62 for engaging corresponding threads of a holding member such as an annular ring 64 disposed to seat against the pole piece 52 and the flange 50 of the electromagnet housing. Thus the abutment member 58 is maintained in operative position relative to the electromagnet 16 by means of a plurality of screws 66 which are disposed in spaced relation about the flange 50 and extend through the flange 50 and ring 64 to secure the electromagnet to an edge of the section 40 of the sectionalized housing. In this instance, in addition to maintaining the annular ring member 64 in assembled position, the screws 66 also aid in positioning the armature assembly 44 and a thin disc 68 of magnetizable material which is disposed over the annular pole piece 54. The disc 68 is preferably of steel having a thickness ranging between .002 and .004 inch so that it will readily saturate and not interfere with the magnetic circuit of the electromagnet, the disc being of a size to fit between the annular ring holding member 64 and the flange 50 of the magnetic housing. As disclosed in Patent No. 2,408,188, issued September 24, 1946, to Austin, a flexible diaphragm 70 of copper or the like is carried by the armature assembly 44 for cooperating with the disc 68 for effecting damping during the operation of the electromagnet.

Figure 3:
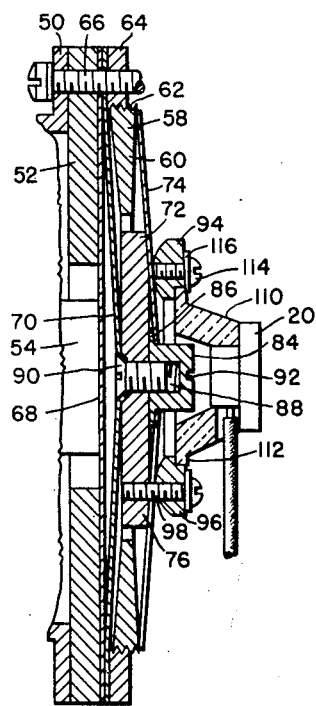
Fig. 3 is a view in section of the armature and spring assembly taken along the line III—III of Fig. 2.
Figure 2:
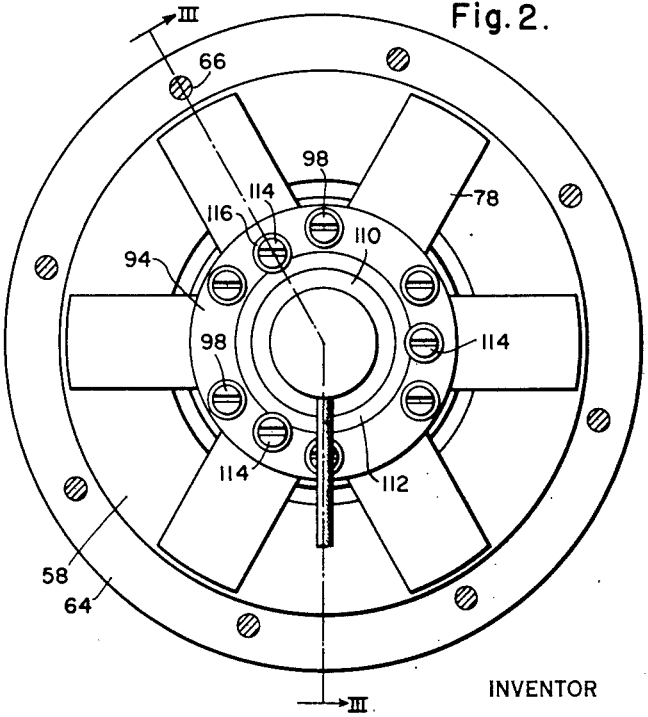
Fig. 2 is a plan view greatly enlarged of the armature and spring assembly of the regulator of Fig. 1.

The details of the armature assembly 44 are more clearly shown in Figs. 2 and 3 of the drawings. Thus the armature 72 is illustrated as disposed centrally of the abutment member 60 and as carrying a spring member 74 and the components for assembling the spring 74 and the armature 72 as a unit. In this instance, the armature member 72 is of annular or disc form and has a surface against which the spring 74 seats provided with a beveled or convex coined portion 76 adjacent the outer edge of the armature 72. The beveled edge 76 extends inwardly from the outer edge of the armature 72 a predetermined distance so that there is a clear line of demarcation between the remaining flat portion of the surface of the armature 72 and the beveled portion 76 of the surface of the armature, the purpose of which will be explained more fully hereinafter.

Figure 4:
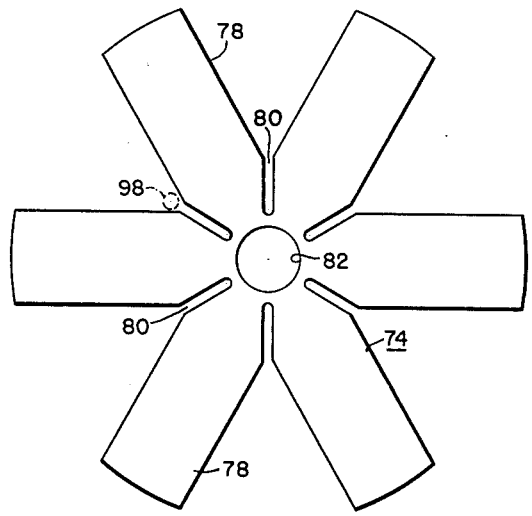
Fig. 4 is a plan view of the spring member of the assembly of Figs. 2 and 3.

The spring 74 is of any suitable metal, being preferably of a single thickness and of star form as shown in Fig. 4 with the rays or fingers 78 extending outwardly therefrom, the spring 74 being normally flat when unrestrained. As illustrated, the fingers 78 of the spring 74 have slots 80 provided therebetween in the central portion of the spring body, the slots 80 extending preferably to within about one-eighth inch of a central opening 82 in the spring member 74. By providing the slots 80, each of the fingers 78 acts as a free cantilever spring and eliminates any Bellville action in the central portion of the spring during forming of the spring member.

Again, referring specifically to Fig. 3, a screw cap 84 is illustrated as having a flanged edge 86 disposed to seat under spring 74 when the cap 84 is positioned to project outwardly through the central opening 82 of the spring 74. The screw cap 84 is provided with a central threaded opening 88 for engaging the end of a screw 90 which extends through the diaphragm 70 and the armature 72 to hold the diaphragm and armature in assembled relation, the cap 84 being adjustable relative to the end of the screw 90. As illustrated, the screw cap 84 has its outer surface provided with a slot 92 for receiving the end of a screw driver (not shown) for adjusting the position of the cap 84 relative to the screw 90.

In order to maintain the spring 74 in an operative position in the armature assembly, an annular ring member 94 having a curved surface 96 is disposed to seat against the fingers 78 of the spring member with the curved surface 96 in line contact engagement substantially along the line of demarcation between the beveled portion 76 and the flat portion of the surface of the armature 72. In order to apply pressure to the spring member to tend to bias it into engagement with the beveled portion 76, a plurality of screws 98 are disposed in spaced relation about the annular member 94 to extend therethrough and between the fingers 78 adjacent the open ends of the slots 80 into the armature 72. The full width of each of the fingers 78 is thus held between the annular member 94 and the surface of the armature 72 along the line of demarcation which constitutes a fulcrum or pivot line for the fingers 78. Thus after the spring 74 is secured against a surface of the armature 72 in this manner, it is quite evident that by adjusting the screw cap member 84 that a predetermined loading or bias can be applied to the fingers 78 of the spring member 74 in order to affect the operating characteristics of the armature assembly.

Figure 5:
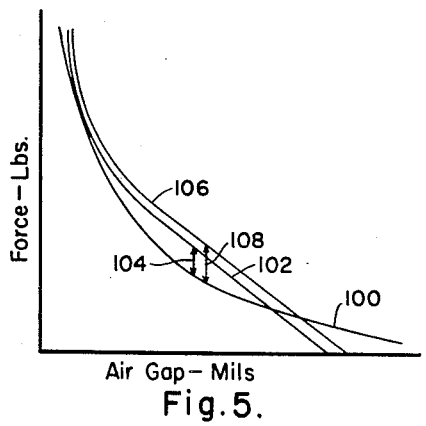
Fig. 5 is a graph, the curves of which illustrate the effect of applying a bias or preload to the spring member in a predetermined manner.

The effect of such an adjustment is clearly shown in the curves of Fig. 5, in which curve 100 represents the magnetic pull curve of the electromagnet and curve 102 represents the initial force curve of the spring 74 as initially held in the position illustrated in Fig. 3. As clearly shown by the space 104 between the curves 100 and 102, it is seen that there is a very small force difference between the curves representing the magnetic pull and the initial spring force. By adjusting the screw cap member 84 so that the flange 86 thereof forces the central portion of the spring 74 outwardly from the armature 72, a predetermined loading may be applied to the spring member 74 so as to change the spring force curve from the position illustrated by curve 102 to that illustrated by curve 106. It is thus seen that the force difference 108 between the magnetic pull curve 100 and the curve 106, representing the preload or bias applied to the spring, is substantially increased.

In order to provide a support for the movable pressure plate 20 which in this instance is a carbon plug, a ceramic cone member 110 is provided having a central opening for receiving the carbon plug 20, the other end of the cone having an outwardly extending flange 112 which seats against the annular ring member 94. A plurality of screw members 114 are disposed in spaced relation about the annular ring member 94 having a sufficiently large head or being provided with washers 116 of a size to overlap the flange edge 112 of the ceramic cone 110 for holding the cone in assembled relation with respect to the armature and spring members. By referring to Fig. 2, it is quite evident that the ceramic cone 110 can be readily removed by simply removing the three screws 114, whereby an adjustment of the screw cap member 84 can be readily made to adjust the bias applied to the spring member 74.

Figure 6:
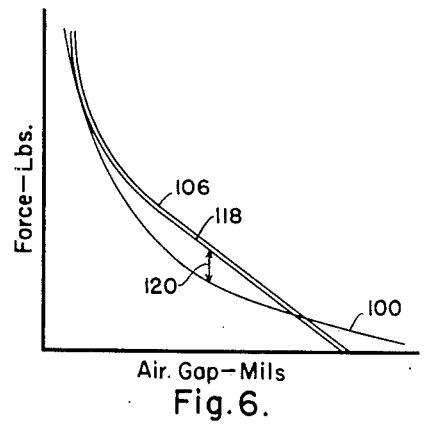
Fig. 6 is a graph, the curves of which illustrate the effect of adjusting the position of the abutment realtive to the face of the electromagnet.

In addition to adjusting the bias of the spring member by changing the position of the screw cap 84, an additional adjustment is available for changing the operating characteristics of the electromagnet. This is evident when it is considered that the abutment 58 is secured in threaded engagement with the ring holding member 64 and the position of the abutment member 58 can be changed relative to the face of the electromagnet simply by turning the abutment in its threaded engagement with the holding ring member 64. The effect of such an adjustment on the operating characteristics is illustrated in Fig 6 in which curve 100 again represents the magnetic pull curve of the electromagnet and curve 106 represents the preloaded or biased spring force characteristics shown in Fig. 5. By suitably adjusting the abutment members 58 in its threaded engagement with the ring holding member 64, the spring force characteristic curve is shifted horizontally to the left to the position illustrated by curve 118 where it is at a tangent to the curve 100 and the force difference 120 is satisfactory for the operation of the regulator. Thus since the curve 106 can be shifted horizontally until it is tangent to the magnetic pull curve 100 at the same point as is shown in Fig. 5, the regulating point, as represented by the point of tangency between the curves 100 and 102 of Fig. 5, remains at the same position which is essential to the obtaining of proper regulation. Therefore such operation provides adjustment to a specified magnetic pull curve, such as the curve 100 in Fig. 5.

Figure 7:
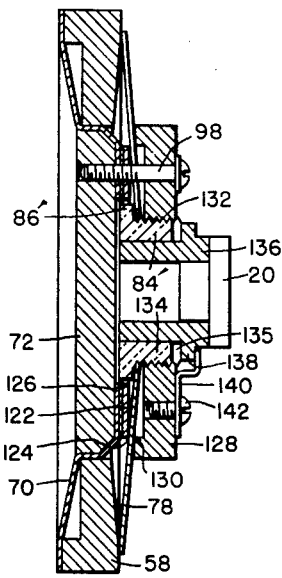
Fig. 7 is a view in section of another embodiment of the armature and spring assembly embodying this invention.

In another embodiment of this invention as illustrated in Fig. 7, the structure of the armature assembly has been modified slightly. In this embodiment, the armature member 72 carries an annular member 122, the outer edge of which provides a line or edge bearing surface 124 upon which the spring fingers 78 seat. The armature member 72 is provided with a cup-shaped diaphragm 70, the outer edges of which extend outwardly to be held under the abutment member 58. In this instance, the abutment member 58 is adapted to be held in fixed assembled position with the electromagnet although it will be understood that the adjustable threaded assembly of the abutment member 58 with the ring member 64 as illustrated in Figs. 1 and 3 may be utilized.

Where required, one or more spacer members 126 may be disposed between the annular member 122 and the face of the armature member 72 in order to control or determine the air gap between the armature member 72 and the core 54.

In order to maintain the components assembled, an annular spring holding member 128 is disposed with a depending flange edge 130 opposite the edge bearing surface 124 of the annular member 122 in seating line engagement with the spring fingers 78. The assembly is secured in assembled position by means of a plurality of spaced screws 98 which extend through the holding member 128 between the fingers 78 and through the annular member 122, spacer member 126, diaphragm 70 into the armature member 72.

As illustrated, the annular holding member 128 is also provided with a central opening having a threaded surface 132 for receiving a flanged collar member 84', the flange 86' of which is disposed between the face of the armature member 72 and the edge of the central opening of the spring member 74. The collar member 84', in this instance, is provided with a threaded surface 134 for engaging the threaded surface 132 of the holding member 128. A slot 135 is provided in the outer edge of the collar member 84' for receiving a screw driver whereby the position of the collar member 84' relative to the holding member 128 can be adjusted to apply a force to the spring member 74 to bias the spring fingers 78 about the edge bearing surface 124 to control the loading of the spring member as the ends of the fingers 78 seat against the abutment member 58.

After the adjustment has been made, a ceramic bushing 136 is positioned within the outer end of the collar member 84', the ceramic bushing being provided with a flange 138 which seats against the end of the collar member 84'. The bushing 136 carries the movable pressure plate 20. In order to maintain the bushing 136 in assembled position, a plurality of spring clips 140 (only one of which is shown) are disposed in spaced relation about the holding member 128 with an end seating against the flange 138 of the bushing 136 and the other end secured to the holding member 128 by a screw 142.

This invention, as illustrated in the embodiments of Figs. 3 and 7, has greatly simplified the construction of pile regulators of the aviation type and makes it possible to readily adjust the spring characteristics so as to obtain predetermined operating characteristics of the regulator. By simplifying the spring assembly and utilizing a single spring of the type illustrated, it is readily apparent that the disadvantages of the spring of the Newton pile regulator have been overcome. Likewise, by providing the adjustments disclosed herein, it is evident that the disadvantages of the regulator of the Walley patent referred to hereinbefore have also been overcome. The regulator is readily manufactured in that variables are maintained at a minimum and the construction facilitates the assembly and the making of adjustments in the operating characteristics. As will be apparent, a considerable savings in time is effected for assembling of the regulator and where necessary repairs can be readily made as different spring members can be substituted for the initial spring member regardless of slight variations in thickness thereof for the adjustments provided make it possible to substitute parts and still provide a regulator having a given operating characteristic.

I claim as my invention:

1. In a pile regulator having a stack of discs of resistance material and an electromagnet disposed for operation to control the pressure applied to the stack, the combination comprising, a holding member carried by the electromagnet, an abutment member secured in assembled relation by the holding member, an armature member for the electromagnet, a spring member that is normally flat when unrestrained disposed to seat against a pivot line formed by the line of demarcation between two surfaces of the armature member, one of said two surfaces farthest from the center of the armature member being beveled the spring member having a central opening and having the opposite ends thereof extending outwardly from the beveled surface of the armature member to seat against the abutment member, holding means disposed to seat against the spring member intermediate the central opening and the ends thereof to secure the spring member in assembled relation with respect to the armature member along the pivot line, and means disposed centrally of the spring member disposed to be adjusted to apply a force to the spring member in opposition to the holding means to thereby control the initial loading of the spring member as it seats against the abutment member, the abutment member being adjustable in its assembled relation with respect to the holding member to adjust the position of the abutment member relative to the ends of the spring member seating thereagainst to vary the operating characteristics of the regulator.

2. In a pile regulator having a stack of discs of resistance material and an electromagnet disposed for operation to control the pressure applied to the stack, the combination comprising, a holding member carried on the electromagnet, an abutment member disposed in threaded engagement with the holding member, the abutment member having an inclined surface thereon, an armature member for the electromagnet, a spring member that is normally flat when unrestrained disposed to seat against a pivot line formed by a substantially flat surface of the armature member and a beveled surface of the armature member, the spring member having a plurality of spaced fingers disposed with the ends thereof extending outwardly from the beveled surface of the armature member to seat on the inclined surface of the abutment member, an annular member disposed in seating engagement with the spaced fingers of the spring member to bias them against the beveled edge of the armature member, means disposed centrally of the spaced fingers disposed to be adjusted to cooperate with the annular member to control the bias applied to the spring fingers, the abutment member being adjustable in its threaded engagement with the holding member to thereby adjust the position of the inclined surface thereof relative to the spaced fingers of the spring member to vary the operating characteristics of the regulator.

3. In a pile regulator having a stack of discs of resistance material and an electromagnet disposed for operation to control the pressure applied to the stack, the combination comprising, an abutment member having an inclined surface disposed upon the electromagnet, an armature member for the electromagnet, a spring member that is normally flat when unrestrained disposed to seat against a pivot line formed by the line of demarcation between two surfaces of the armature member, one of said two surfaces farthest from the center of the armature member being beveled, the spring member having a central opening therein and a plurality of spaced fingers extending outwardly beyond the beveled surface of the armature member to seat on the inclined surface of the abutment member, an annular member disposed in seating engagement with the spaced fingers of the spring member to bias them against the pivot line, a threaded member extending outwardly from the armature member through the central opening of the spring member, and a flanged collar member disposed in threaded engagement with the threaded member with the flange thereof disposed between the armature member and the edge of the central opening of the spring member, the flanged collar member being disposed to be adjusted relative to the threaded member and thereby cooperate with the annular member to control the loading of the spring fingers.

4. In a pile regulator having a stack of discs of resistance material and an electromagnet disposed for operation to control the pressure applied to the stack, the combination comprising, a core member for the electromagnet, an abutment member carried by the electromagnet, an armature member for the electromagnet, a spring member that is normally flat when unrestrained disposed to be carried by the armature member, the spring member having a central opening therein and having opposite ends thereof extending outwardly from opposite edges of a surface of the armature member to seat on the abutment member, means carried by said surface of the armature member disposed to provide predetermined bearing points for the spring member between the central opening therein and the opposite ends thereof and to provide the desired air gap between the core member and the armature member, a spring holding member carried by the armature member, the holding member being disposed in a line seating engagement with the spring member opposite the predetermined bearing points to maintain the spring member therebetween, and a flanged collar member disposed in threaded engagement with the spring holding means with the flange thereof disposed between the armature member and the edge of the central opening of the spring member, the flanged collar member being disposed to be adjusted relative to the spring holding member to apply a force to the spring member in opposition to the holding means to bias the spring member about the bearing points and control the loading of the spring member as it seats against the abutment member.

5. In a pile regulator having a stack of discs of resistance material and an electromagnet disposed for operation to control the pressure applied to the stack, the combination comprising, a core member for the electromagnet, an abutment member carried by the electromagnet, an armature member for the electromagnet, a spring member that is normally flat when unrestrained disposed to be carried by the armature member, the spring member having a central opening therein and a plurality of spaced fingers extending outwardly beyond the edge of the armature member to seat on the abutment member, an annular member carried by the armature member disposed to provide an edge bearing surface for the spaced fingers of the spring member, a spacer member disposed between the armature member and the annular member disposed to provide the desired air gap between the armature member and the core member, an annular holding member secured to the armature member and disposed to provide an edge pressure surface opposite the edge bearing surface to maintain the spaced fingers therebetween, and a flanged collar member disposed to extend outwardly from the armature member through the central opening of the spring member with the flange thereof disposed between the armature member and the edge of the central opening of the spring member, the flanged collar member being disposed for adjustment relative to the annular holding member to apply a force to the edge of the central opening of the spring member in opposition to the holding member to bias the fingers of the spring member about the bearing points and control the loading of the spring fingers as they seat against the abutment member.

6. In a pile regulator having a stack of resistance material and an electromagnet disposed for operation to control the pressure applied to the stack, the combination comprising, a core member for the electromagnet, an abutment member carried by the electromagnet, an armature member for the electromagnet, a spring member that is normally flat when unrestrained disposed to be carried by the armature member, the spring member having opposite ends thereof extending outwardly from opposite edges of a surface of the armature member to seat on the abutment member, a holding member carried by the armature member disposed in a seating substantially line contact engagement with the spring member intermediate the ends thereof to maintain the spring member positioned between the armature member and the holding member, means disposed centrally of the spring member disposed to be adjusted to move the central portion of the spring member relative to the line contact engagement of the holding member to control the loading of the spring member as it seats against the abutment member, and means cooperating with the abutment member to change the angle that the spring member makes with the abutment member to thereby obtain the desired air gap between the core member and the armature member.

HARRISON H. C. RICHARDS, JR.

REFERENCES CITED

The following references are of record in the file of this patent:

UNITED STATES PATENTS

| Number | Name | Date |
|---|---|---|
| 2,268,718 | Newton | Jan. 6, 1942 |
| 2,488,455 | Walley | Nov. 15, 1949 |